(12) United States Patent
Kettenis (10) Patent No.: US 12,260,520 B2
(45) Date of Patent: Mar. 25, 2025

(54) IMAGE RESOLUTION ENHANCEMENT BY VALUE TRANSFER

(71) Applicant: V-Silicon Semiconductor (Hefei) Co., Ltd, Hefei (CN)

(72) Inventor: Jeroen Maria Kettenis, Geldern (DE)

(73) Assignee: V-Silicon Semiconductor (Hefei) Co., Ltd, Hefei (CN)

( * ) Notice: Subject to any disclaimer, the term of this patent is extended or adjusted under 35 U.S.C. 154(b) by 450 days.

(21) Appl. No.: 17/850,745

(22) Filed: Jun. 27, 2022

(65) Prior Publication Data

US 2023/0419448 A1 Dec. 28, 2023

(51) Int. Cl.
*G06T 5/00* (2024.01)
*G06T 3/40* (2006.01)

(52) U.S. Cl.
CPC .................. *G06T 5/00* (2013.01); *G06T 3/40* (2013.01); *G06T 2207/20076* (2013.01)

(58) Field of Classification Search
CPC ... G06T 5/00; G06T 3/40; G06T 2207/20076; G06T 3/4053; G06T 5/73; G06T 5/20; G06T 2207/20192
USPC ........................................................ 348/264
See application file for complete search history.

(56) References Cited

U.S. PATENT DOCUMENTS 6,133,957 A * 10/2000 Campbell ............... G06T 3/403
348/699

* cited by examiner

*Primary Examiner* — Stephen P Coleman
(74) *Attorney, Agent, or Firm* — Schwegman Lundberg & Woessner, P.A.

(57) ABSTRACT

In one aspect, a method, includes producing a centralness metric that is highest at a center of detail from a set of pixels and having a negative slope to neighboring pixels from a center pixel at the center of detail, calculating a delta signal for the set of pixels using the produced centralness metric and pixel values of the set of pixels, generating a squeezed pixel value for each of the pixel values of the set of pixels, and outputting the generated squeezed pixel values.

22 Claims, 8 Drawing Sheets

IMAGE RESOLUTION ENHANCEMENT BY VALUE TRANSFER

TECHNICAL FIELD

The present disclosure relates to image processing, and particularly, but not exclusively, to enhancing resolution of images using value transfer.

BACKGROUND

A low image resolution can make pictures and video appear blurry. Image resolution enhancement can improve the appearance of pictures and video.

BRIEF SUMMARY

In one aspect, a method, includes producing a centralness metric that is highest at a center of detail from a set of pixels and having a negative slope to neighboring pixels from a center pixel at the center of detail, calculating a delta signal for the set of pixels using the produced centralness metric and pixel values of the set of pixels, generating a squeezed pixel value for each of the pixel values of the set of pixels, and outputting the generated squeezed pixel values. Further, an amplitude of pixel(s) at the center of detail may be boosted.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

This disclosure presents a system and method for spatial resolution enhancement, e.g., for spatially small detail (some pixels in diameter). The method first determines a signal 'detail centralness' that gives a local maximum at centers of details. The delta of this signal with that at its neighbor pixels in various spatial directions, as well as the delta of the original signal with its neighbor pixels, are used for a non-linear filtering from the original signal to the filtered signal, with the result that details are spatially squeezed and boosted.

For spatially small, non-structural detail, there is ambiguity in how a lower resolution version relates to a higher resolution version thereof. To break through this ambiguity, an assumption is made (that does not have to be true to life): Detail at a higher resolution image shall be a 'thinned version' of the detail in lower resolution. The disclosure deals with a way to make this thinned version of details by a combination of squeezing and boosting. The squeezing is already generating a condensed version of the detail, yet if the levels that were present on the original detail get applied on a smaller area, the detail will appear less intense. So, a boost (increase) in amplitude of the squeezed detail is needed to get sufficient 'body', either similar to that of the original thicker detail or, as a detail boosting feature, beyond that.

Figure 1:
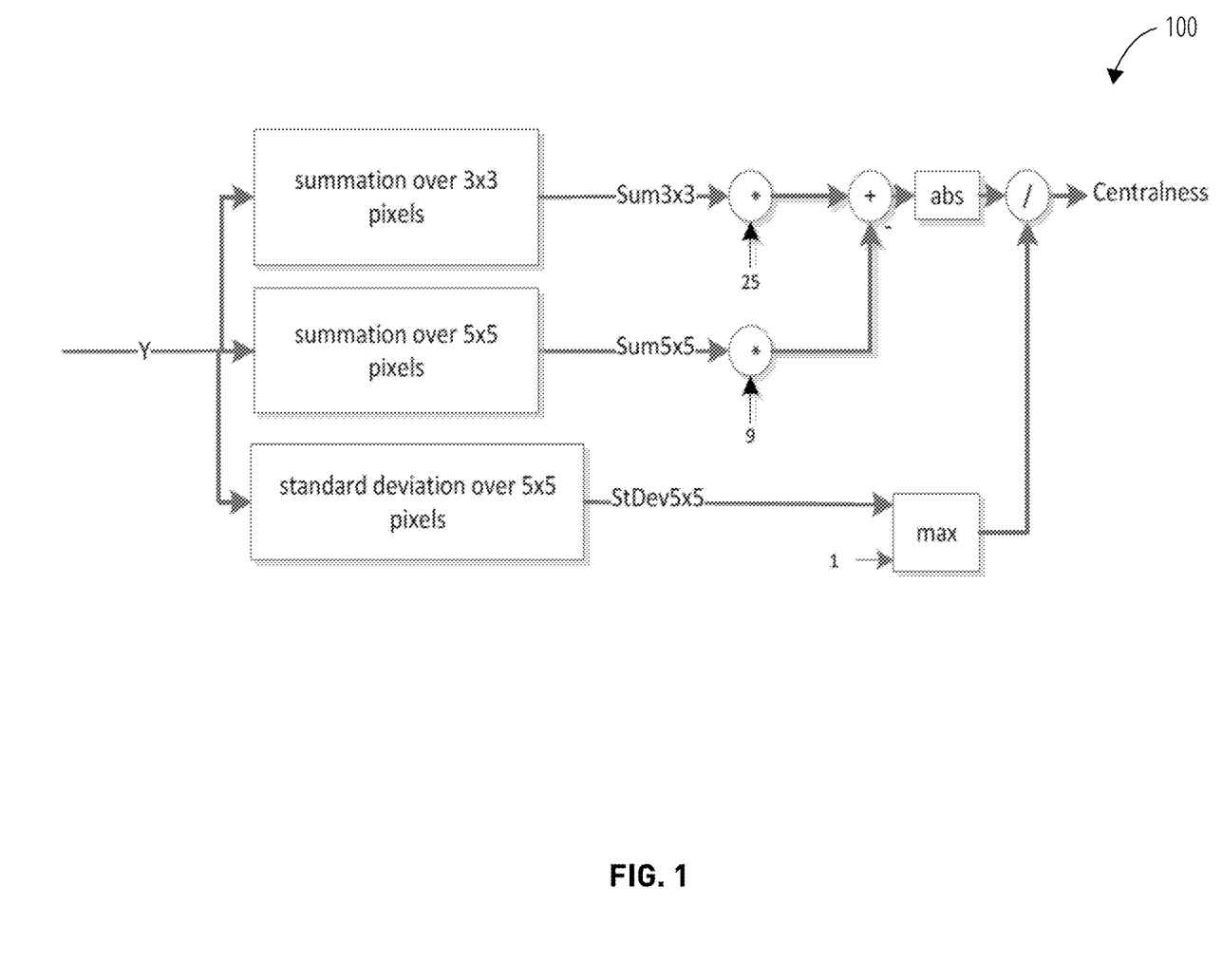
FIG. 1 illustrates an aspect of a centralness circuit.

FIG. 1 illustrates an aspect of a centralness circuit 100. The first processing step produces a metric 'central-ness' that has the characteristic that it is highest at the center of a detail and has a negative slope to neighbor pixels, if there is at that neighbor location more distance to the center of the detail. (For understanding: If the detail is dot like, the negative slope exists in all directions, but if the detail is hair like, the negative slope is only in the directions perpendicular to the hair and not across the hair.) It is advantageous to have a normalization in the metric so that there is indifference to both the amplitude and the polarity of the detail.

An example circuit that exhibits this characteristic on a signal with pixel values 'Y' is calculating according:

$$\text{Centralness} = \text{ABS}(25 * \Sigma 3 \times 3 \text{ samples}(Y) - 9 * \Sigma 5 \times 5 \text{ samples}(Y)) / \text{MAX}(\text{standard\_deviation } 5 \times 5 \text{ pixels}, 1)$$

The centralness circuit 100 is an implementation of the above equation.

Figure 2:
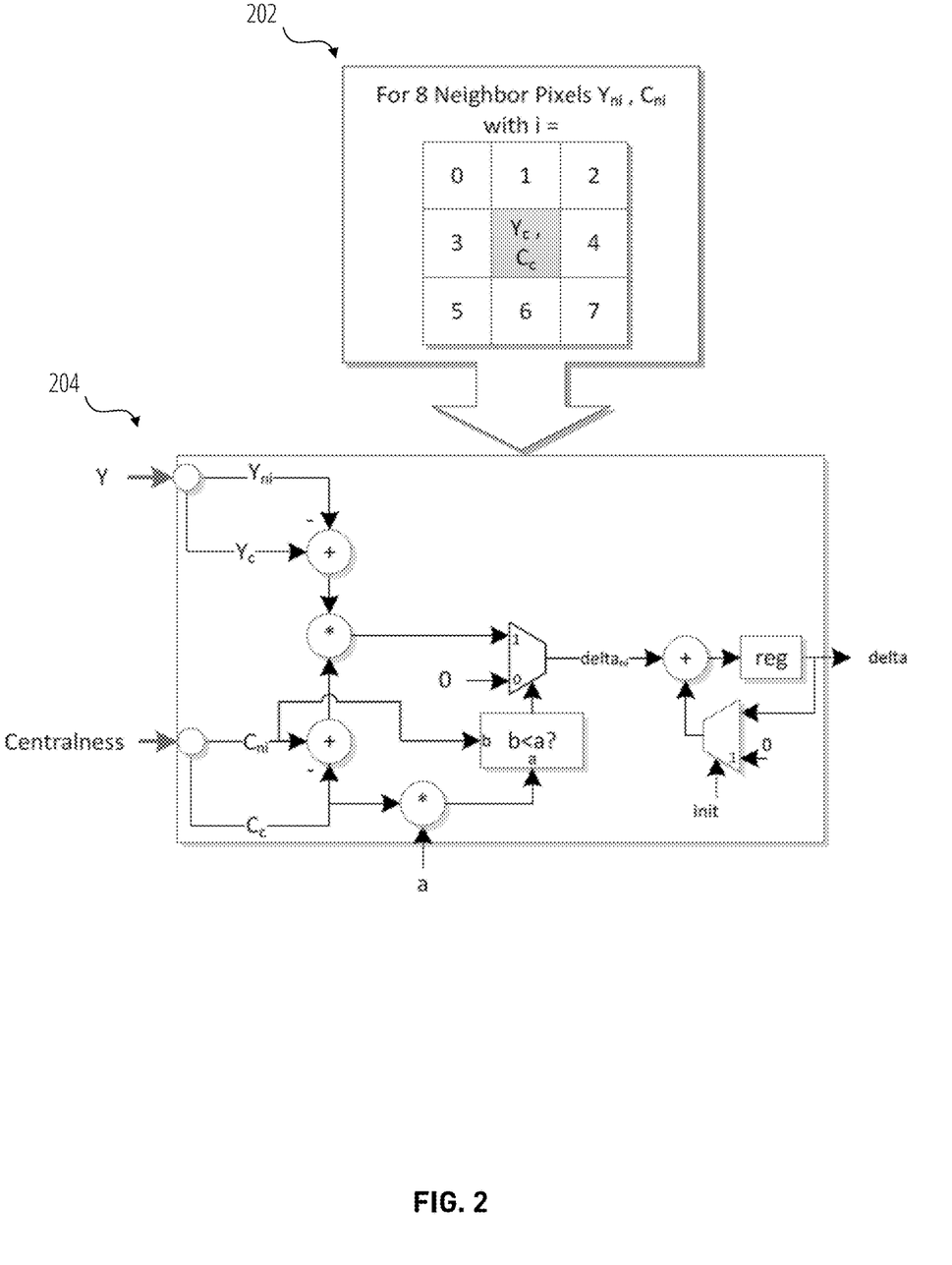
FIG. 2 illustrates an aspect of a delta signal calculating circuit.

FIG. 2 illustrates an aspect of a delta circuit 204 with pixel input 202. Further example processing applies the above formed 'central-ness' values along with the 'Y' pixel values for the central pixel and multiple neighbor pixels in that for each pair (central pixel 'C' neighbor pixel 'Ni') there is a delta signal build according to the formula:

$$\text{delta}_{ni} = (Y_C - Y_{Ni}) * (\text{Centralness}_{ni} - \text{Centralness}_C), \text{ if } \text{Centralness}_{ni} < \text{Centralness}_C * a$$

$$\text{delta}_{ni} = 0, \text{ otherwise}$$

('a' is a parameter, fractional in the range [0 . . . 1] that can be set to a desired value and determines the central fraction of the detail that remains untouched.)

This being exercised over all 8 central-to-neighbor pairs pixel input 202, a summation thereof is done for a delta signal according delta==1 . . . n(delta$_{neighbor\ i}$) as shown in FIG. 2.

Figure 3:
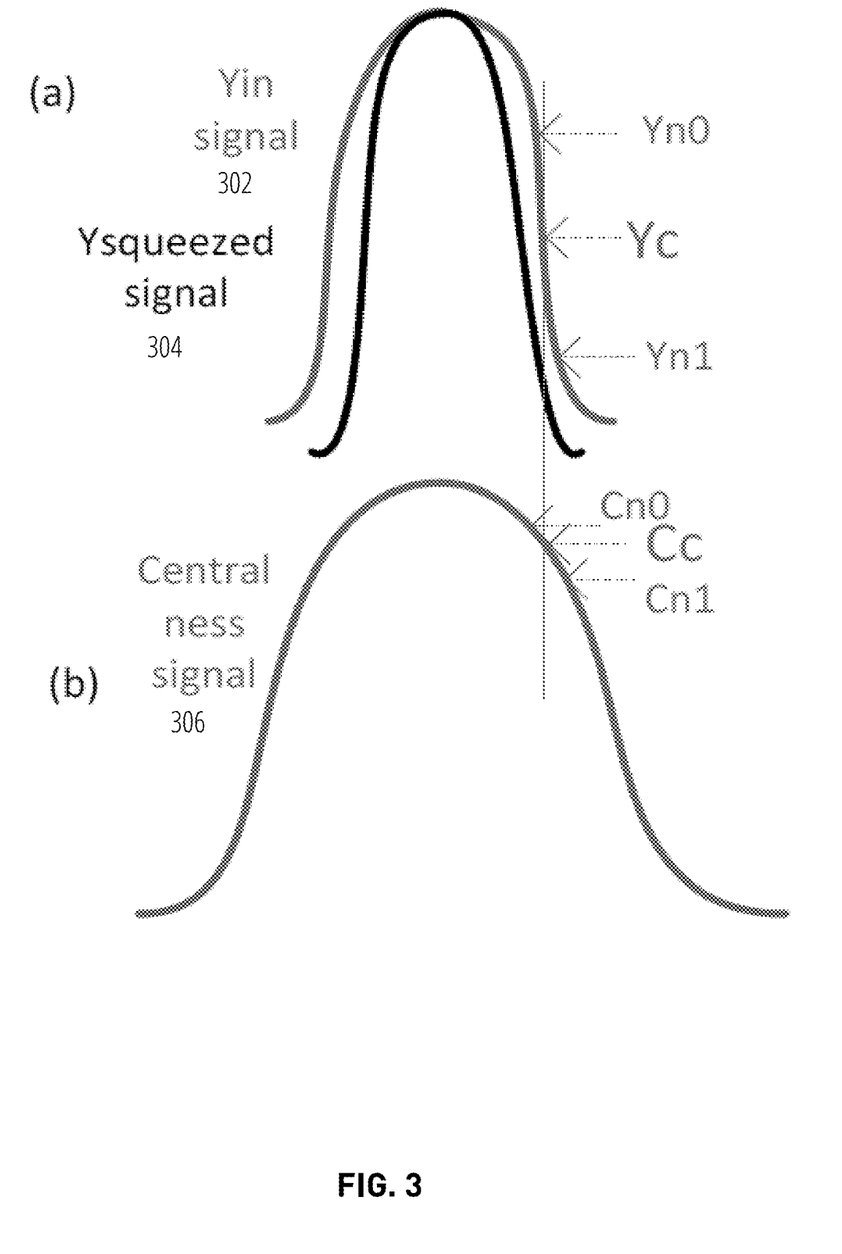
FIG. 3 illustrates a graph of an input signal and resulting squeezed signal.

FIG. 3 illustrates a graph of an input signal and resulting squeezed signal. The 'squeezed' result Ysqueezed signal 304 for the position of the central pixel is $Y_C$, squeezed=$Y_C$+ gain*delta as shown in the 1-dimensional example in FIG. 3. At a current pixel position, Y (e.g., luminance) has the value $Y_C$ and centralness signal 306 has value $C_C$.

Centralness$_{n0}$>Centralness$_C$, so the condition 'Centralness$_{n0}$<Centralness$_C$*a' will not be true Provided that 'Centralness$_{n1}$<Centralness$_C$*a' is true, $Y_{N1}$ has a lower value than $Y_C$ and $C_{N0}$ has a lower value than $C_C$. Thus delta$_{n1}$=($Y_C$-$Y_{N1}$)*(Centralness$_{n1}$-Centralness$_C$) is a negative value, making $Y_C$, squeezed lower than the original $Y_C$ This results in squeezing from the source Yin signal 302 to the resulting Ysqueezed signal 304, (with potential undershoots).

The gain is a combination of a user-selectable gain and an adaptive gain that a designer finds suitable for the particular signal conditions in the neighborhood of pixels. This adaptive gain will be arranged by the principle that where the processing is judged to have a desirable effect the gain is nominal and where the processing has a less desirable effect, the gain is reduced.

The latter is, for example, a case where the central pixel is on an edge. This is because the detail squeezing method described will not squeeze the edge in total, but will squeeze the lower and the upper part of the edge separately and thus distort, rather than enhance, it.

The above operation will keep the most central part of a detail at the original value, but moves the values around that most central part towards and even beyond the environment value. It thus has a thinning effect on the detail, with some over/undershoot when the gain is set beyond a certain value. The over- and undershoots can eventually be limited, e.g., to an absolute value or a fraction of the standard deviation.

Figure 4:
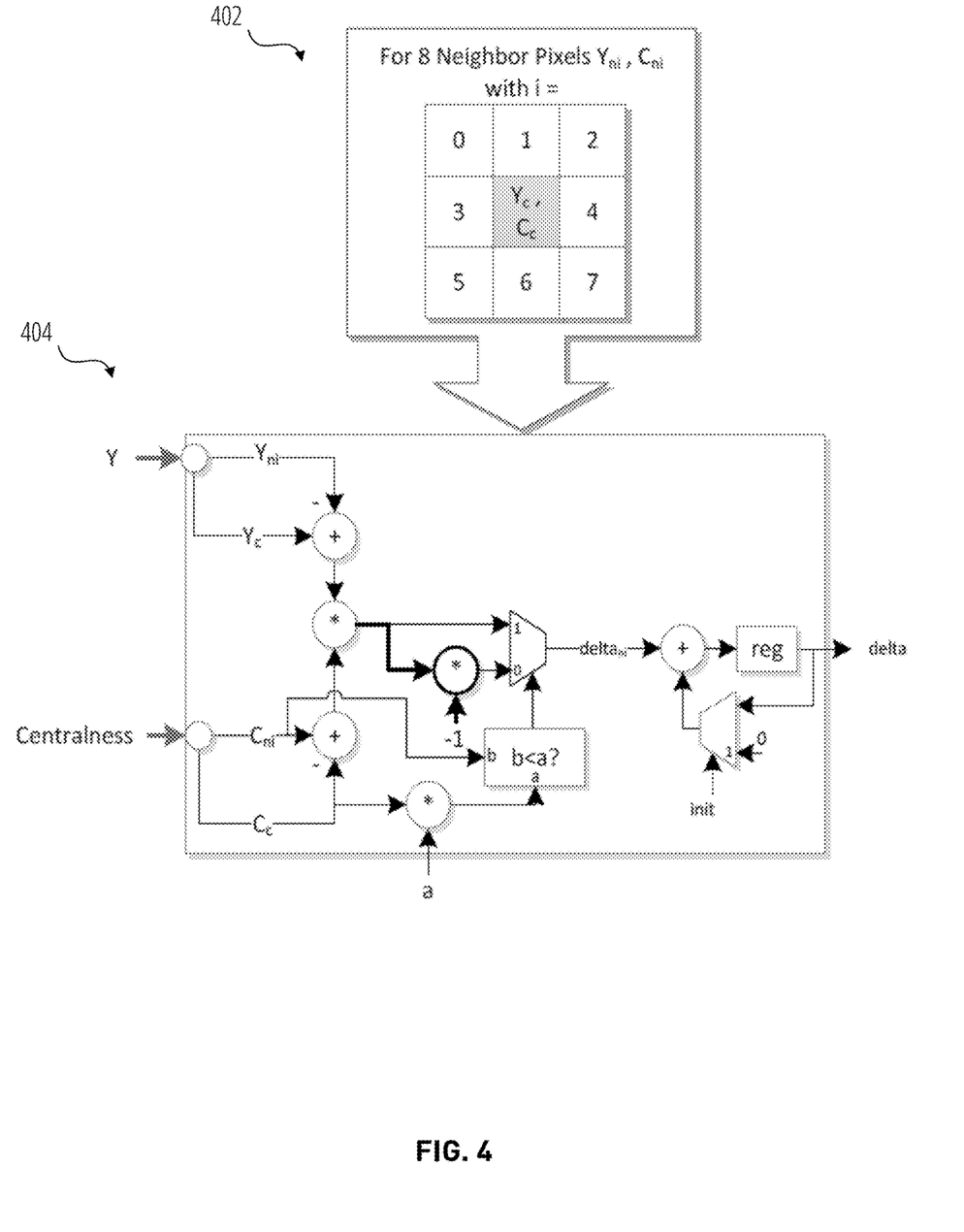
FIG. 4 illustrates an aspect of a second delta signal calculating circuit.

FIG. 4 illustrates an aspect of a second delta circuit 404 with pixel input 402. In order to also boost the value of the most central part, some additional structures are used. A possibility is to alter the 'otherwise' part in the formula for calculating delta into $$\text{delta}_{ni} = -(Y_C - Y_{Ni}) * (\text{Centralness}_{ni} - \text{Centralness}_C), \text{otherwise}$$

This however requires additional structure to prevent that around the threshold value a sudden jump in the delta signal is generated as will be discussed in conjunction with FIG. 5.

Figure 5:
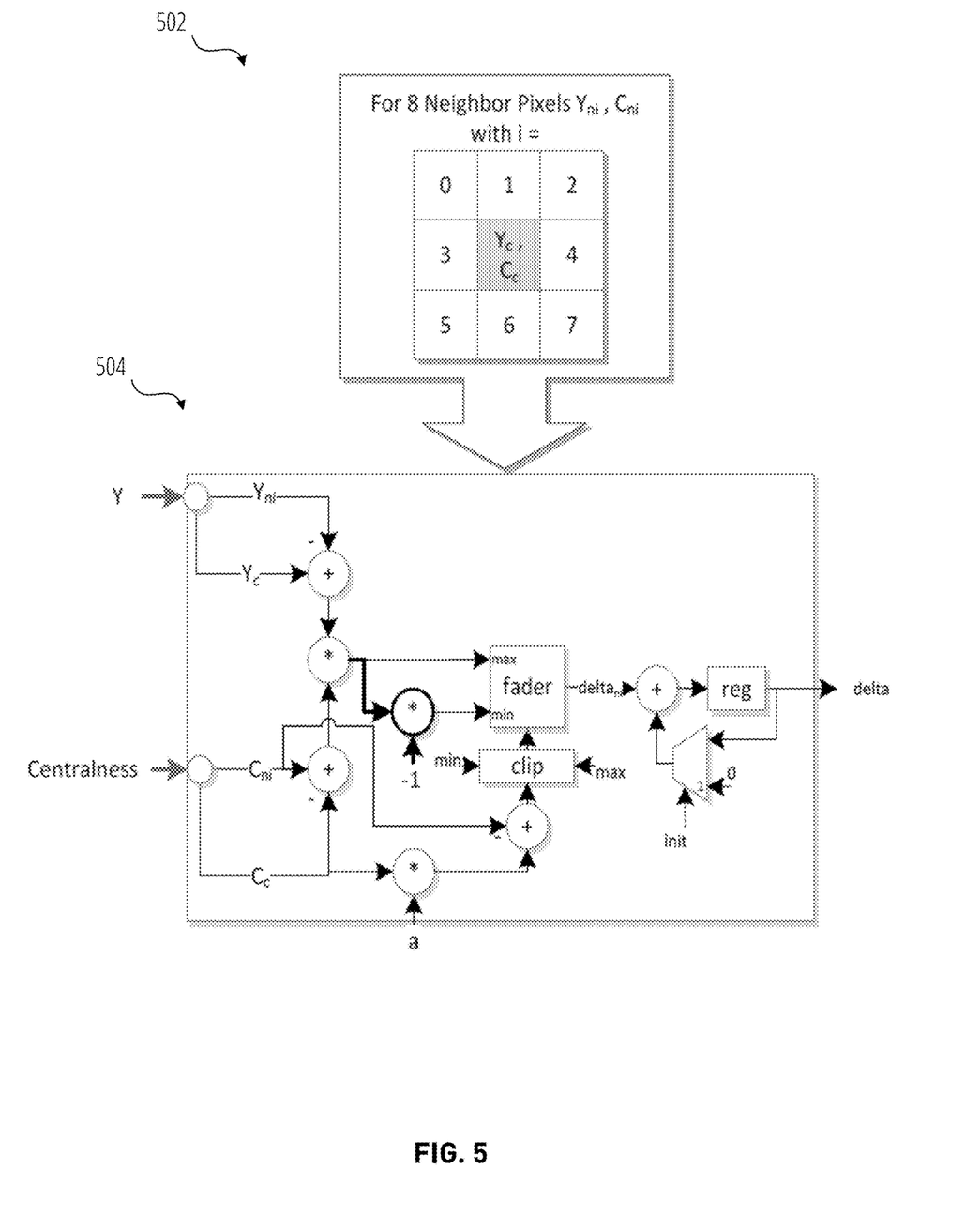
FIG. 5 illustrates an aspect of a third delta signal calculating circuit.

FIG. 5 illustrates an aspect of a third delta circuit 504 with pixel input 502. An example implementation of the additional structure is to apply soft-switching, by means of fading-over between the 'if $\text{Centralness}_{ni} < \text{Centralness}_C * a$' and the 'otherwise' clauses, mentioned above, e.g. modulated by how much $\text{Centralness}_C$ exceeds a chosen threshold.

Figure 6:
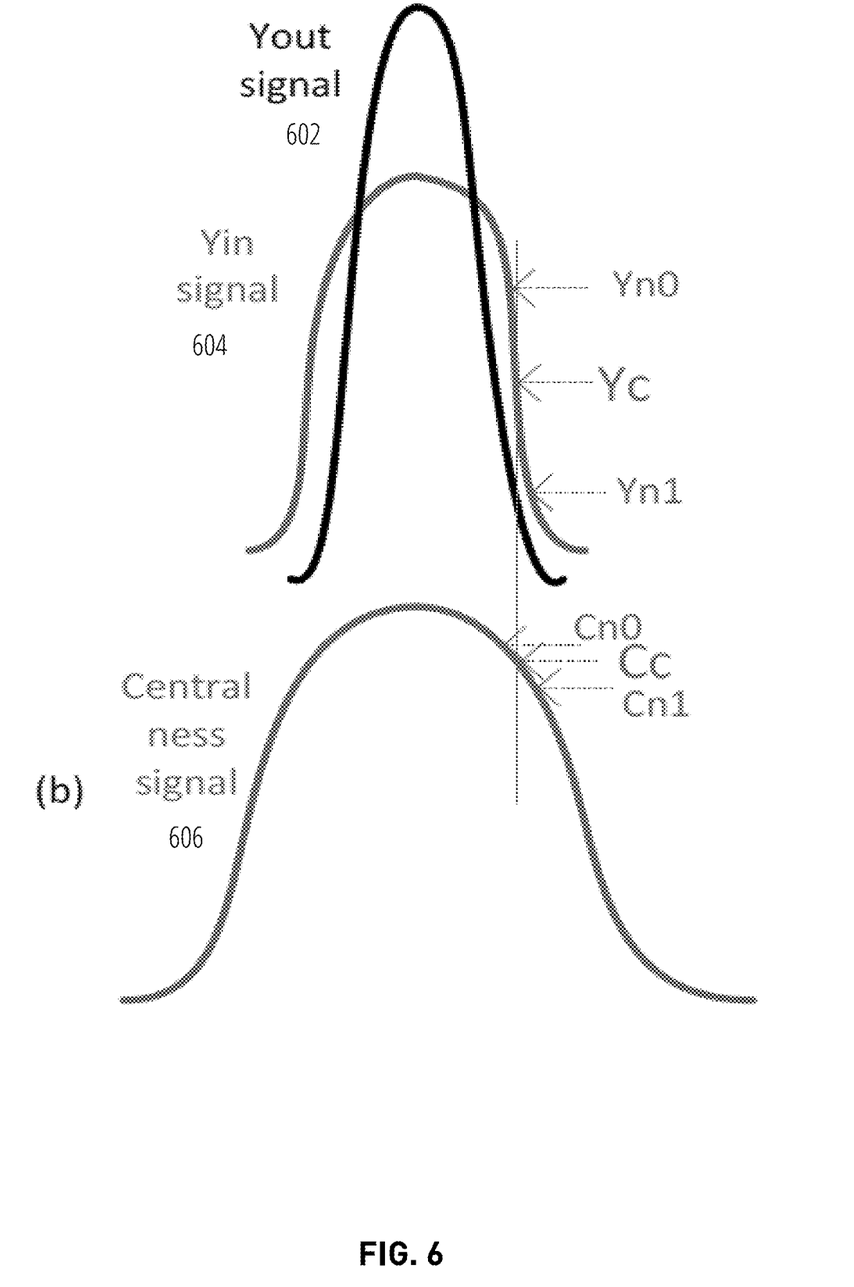
FIG. 6 illustrates a graph of an input signal and resulting squeezed signal.

FIG. 6 illustrates a graph of a Yin signal 302 and resulting Ysqueezed signal 304. Now, in addition to the squeezing property shown in FIG. 4, there is also boosting at the part with the highest Centralness levels of the Centralness signal 606.

Figure 7:
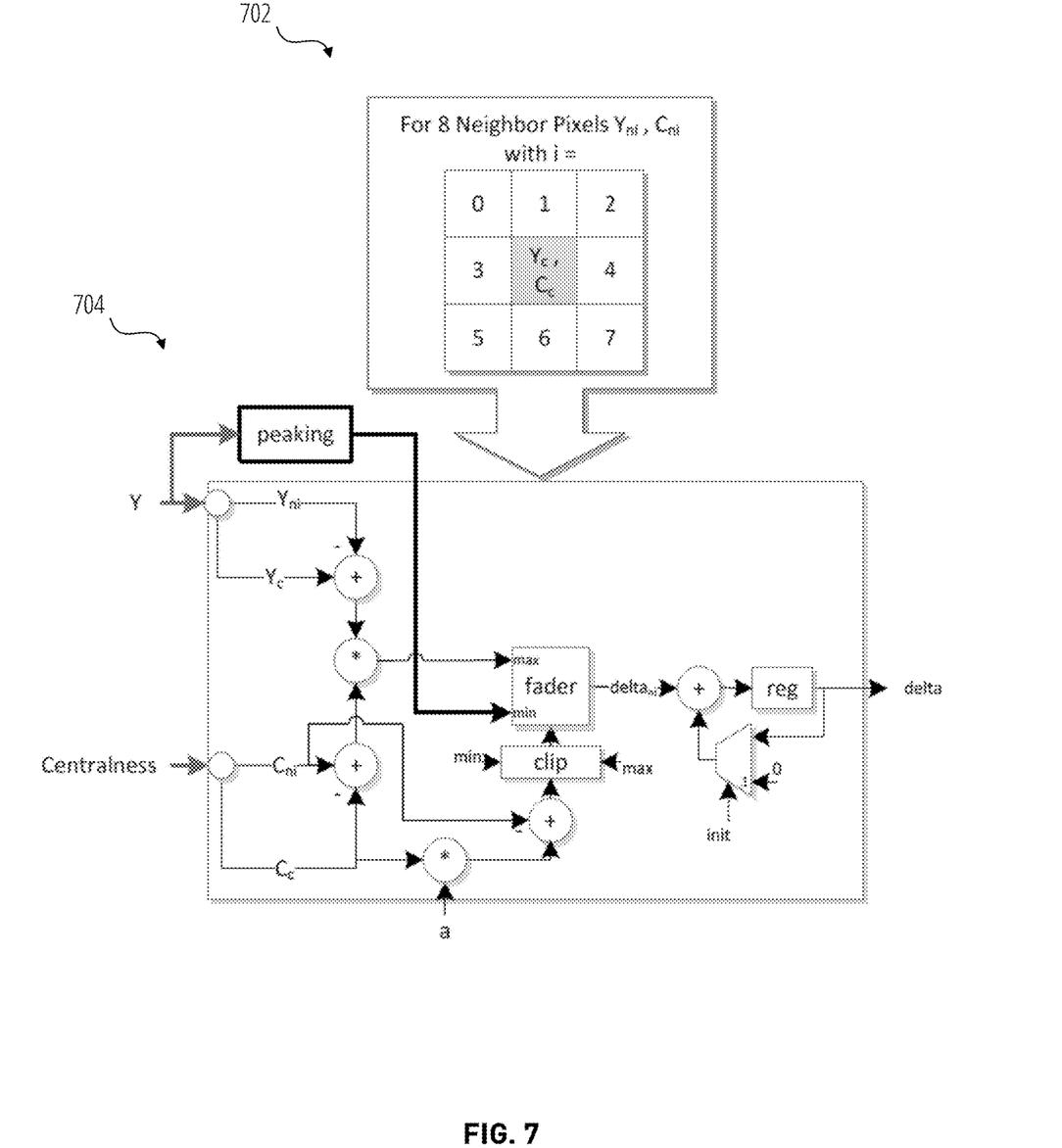
FIG. 7 illustrates an aspect of a fourth delta signal calculating circuit.

FIG. 7 illustrates an aspect of a fourth delta circuit 704 with pixel input 702. Alternatively for the boosting as shown in FIG. 7, a normal (2 dimensional) peaking high-pass operation can be used to boost the most central part of the detail specifically, controlled in a same way as in FIG. 7

The use of a 'Central-ness' metric that has a maximum at the center of a detail will have an adverse sharpening effect on edge areas (containing a slope in some orientation). Either the effect of the above processing is turned down in vicinity of edges or an alternative 'Central-ness' is applied there that exhibits a maximum at the center of the edge and has a negative slope perpendicular to the edge.

In an application of this SuperResolution principle, the neighbor pixels can be selected alternatively as:
the 4 direct horizontal and vertical neighbor pixels;
the 4 diagonal neighbor pixels;
the 8 direct neighbor pixels, being horizontal, vertical and diagonal neighbor pixels;
neighbor pixels that are more distant from the central pixel;
neighbor pixels at various distances from the central pixel;
neighbor pixels at a variable distance from the central pixel, where the distance is controlled by a further metric, such as the 'resolution' or 'steepness' of the source signal (locally or globally).

Pixel values could be in the form of luminance, color-difference, R, G or B values or variants of these.

Figure 8:
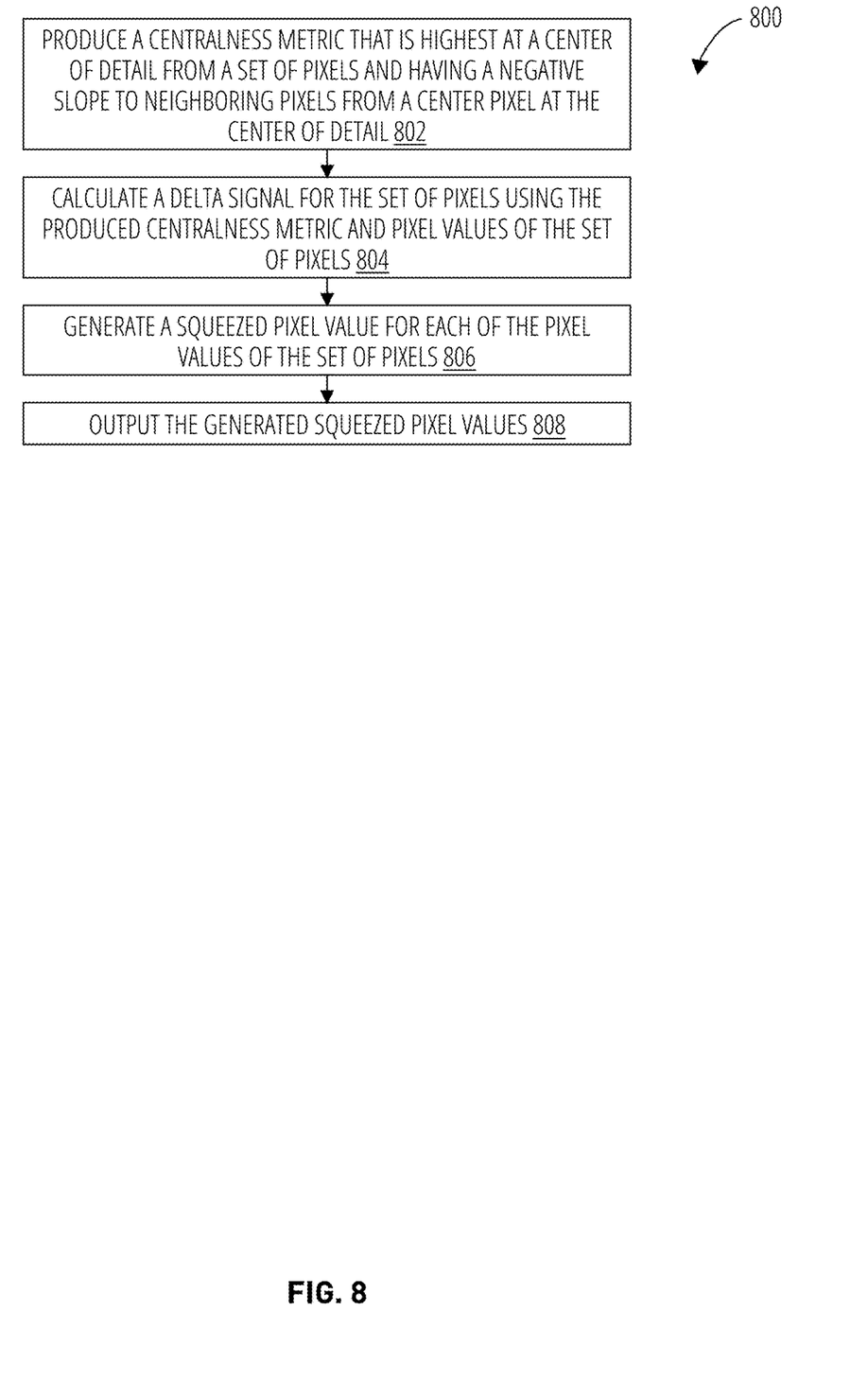
FIG. 8 illustrates a method.

In block 802, method 800 produces a centralness metric that is highest at a center of detail from a set of pixels and having a negative slope to neighboring pixels from a center pixel at the center of detail. In block 804, method 800 calculates a delta signal for the set of pixels using the produced centralness metric and pixel values of the set of pixels. In block 806, method 800 generates a squeezed pixel value for each of the pixel values of the set of pixels. In block 808, method 800 outputs the generated squeezed pixel values, e.g., for display. In addition, in an embodiment, the method 800 may also comprise boosting an amplitude of the squeezed pixel values, e.g., at the center of detail (e.g., highest centranless).

The following examples describe various embodiments of methods, machine-readable media, and systems (e.g., machines, devices, or other apparatus) discussed herein.

1. A method, comprising:
producing a centralness metric that is highest at a center of detail from a set of pixels and having a negative slope to neighboring pixels from a center pixel at the center of detail; calculating a delta signal for the set of pixels using the produced centralness metric and pixel values of the set of pixels;
generating a squeezed pixel value for each of the pixel values of the set of pixels; and
outputting the generated squeezed pixel values.

2. The method of example 1, wherein the pixel value is luminance.

3. The method of any of the preceding examples, wherein the set of pixels includes 8 pixels surrounding the center pixel.

4. The method of any of the preceding examples, wherein producing the centralness metric comprises calculating ABS $(25*\Sigma 3\times 3 \text{ samples}(Y) - 9*\Sigma 5\times 5 \text{ samples}(Y))/\text{MAX}(\text{standard\_deviation } 5\times 5 \text{ pixels}, 1)$, wherein Y is a pixel value.

5. The method of any of the preceding examples, wherein calculating the delta signal comprises calculating $(Y_C - Y_{Ni}) * (\text{Centralness}_{ni} - \text{Centralness}_C)$, wherein $Y_C$ is a pixel value for the central pixel, $Y_{Ni}$ is a pixel value of a neighbor pixel, $\text{Centralness}_{ni}$ is a produced centralness metric for the neighboring pixel and $\text{Centralness}_C$ is a produced centralness metric for the center pixel.

6. The method of any of the preceding examples, wherein the delta signal for the neighboring pixel is set to zero if $\text{Centralness}_{ni} > \text{Centralness}C * a$.

7. The method of any of the preceding examples, wherein the delta signal for the neighboring pixel is set to $-(Y_C - Y_{Ni}) * (\text{Centralness}_{ni} - \text{Centralness}_C)$ if Centralnessni>CentralnessC*a.

8. The method of any of the preceding examples, wherein calculating the delta signal further comprises summing the calculated signals for each pixel of the set of pixels.

9. The method of any of the preceding examples, wherein generating the squeezed pixel comprises adding a gain times the delta signal to the central pixel value.

10. The method of any of the preceding examples, wherein the set of pixels includes four diagonal neighbor pixels.

11. The method of any of the preceding examples, wherein the set of pixels includes four pixels in a horizontal and vertical direction.

12. The method of any of the preceding examples, further comprising boosting an amplitude of one or more pixel values at the center of detail.

13. A system, comprising:
a centralness circuit configured to produce a centralness metric that is highest at a center of detail from a set of pixels and having a negative slope to neighboring pixels from a center pixel at the center of detail; and a delta circuit coupled to the centralness circuit configured to calculate a delta signal for the set of pixels using the produced centralness metric and pixel values of the set of pixels;

generate a squeezed pixel value for each of the pixel values of the set of pixels; and output the generated squeezed pixel values.

14. The system of any of the preceding examples, wherein the pixel value is luminance.

15. The system of any of the preceding examples, wherein the set of pixels includes 8 pixels surrounding the center pixel.

16. The system of any of the preceding examples, wherein producing the centralness metric comprises calculating ABS (25*Σ3×3 samples(Y)−9*Σ5×5 samples(Y))/MAX(standard_deviation 5×5 pixels, 1), wherein Y is a pixel value.

17. The system of any of the preceding examples, wherein calculating the delta signal comprises calculating $(Y_C-Y_{Ni})$*(Centralness$_{ni}$−Centralness$_C$), wherein $Y_C$ is a pixel value for the central pixel, $Y_{Ni}$ is a pixel value of a neighbor pixel, Centralness$_{ni}$ is a produced centralness metric for the neighboring pixel and Centralness$_C$ is a produced centralness metric for the center pixel.

18. The system of any of the preceding examples, wherein the delta signal for the neighboring pixel is set to zero if Centralnessni>CentralnessC*a.

19. The system of any of the preceding examples, wherein the delta signal for the neighboring pixel is set to −$(Y_C-Y_{N1})$*(Centralness$_{ni}$ Centralness$_C$) if Centralnessni>CentralnessC*a.

20. The system of any of the preceding examples, wherein calculating the delta signal further comprises summing the calculated signals for each pixel of the set of pixels.

21. The system of any of the preceding examples, wherein generating the squeezed pixel comprises adding a gain times the delta signal to the central pixel value.

22. The system of any of the preceding examples, wherein the set of pixels includes four diagonal neighbor pixels.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
   producing a centralness metric that is highest at a center of detail from a set of pixels and having a negative slope to neighboring pixels from a center pixel at the center of detail;
   calculating a delta signal for the set of pixels using the produced centralness metric and pixel values of the set of pixels;
   generating a squeezed pixel value for each of the pixel values of the set of pixels; and
   displaying the set of pixels on a display based on the generated squeezed pixel values.

2. The method of claim 1, wherein the pixel value is luminance.

3. The method of claim 1, wherein the set of pixels includes 8 pixels surrounding the center pixel.

4. The method of claim 3, wherein producing the centralness metric comprises calculating ABS(25*Σ3×3 samples (Y)−9*Σ5×5 samples(Y))/MAX(standard_deviation 5×5 pixels, 1), wherein Y is a pixel value.

5. The method of claim 4, wherein calculating the delta signal comprises calculating $(Y_C-Y_{Ni})$*(Centralness$_{ni}$−Centralness$_C$), wherein $Y_C$ is a pixel value for the central pixel, $Y_{Ni}$ is a pixel value of a neighbor pixel, Centralness$_{ni}$ is a produced centralness metric for the neighboring pixel and Centralness$_C$ is a produced centralness metric for the center pixel.

6. The method of claim 5, wherein the delta signal for the neighboring pixel is set to zero if Centralnessni>CentralnessC*a.

7. The method of claim 5, wherein the delta signal for the neighboring pixel is set to −$(Y_C-Y_{Ni})$*(Centralness$_{ni}$−Centralness$_C$) if Centralnessni>CentralnessC*a.

8. The method of claim 5, wherein calculating the delta signal further comprises summing the calculated signals for each pixel of the set of pixels.

9. The method of claim 8, wherein generating the squeezed pixel comprises adding a gain times the delta signal to the central pixel value.

10. The method of claim 1, wherein the set of pixels includes four diagonal neighbor pixels.

11. The method of claim 1, wherein the set of pixels includes four pixels in a horizontal and vertical direction.

12. The method of claim 1, further comprising boosting an amplitude of one or more pixel values at the center of detail.

13. A system, comprising:
   a centralness circuit configured to produce a centralness metric that is highest at a center of detail from a set of pixels and having a negative slope to neighboring pixels from a center pixel at the center of detail; and
   a delta circuit coupled to the centralness circuit configured to
   calculate a delta signal for the set of pixels using the produced centralness metric and pixel values of the set of pixels;
   generate a squeezed pixel value for each of the pixel values of the set of pixels; and
   display the set of pixels on a display based on the generated squeezed pixel values.

14. The system of claim 13, wherein the pixel value is luminance.

15. The system of claim 13, wherein the set of pixels includes 8 pixels surrounding the center pixel.

16. The system of claim 15, wherein producing the centralness metric comprises calculating ABS($25*\Sigma 3\times 3$ samples(Y)$-9*\Sigma 5\times 5$ samples(Y))/MAX(standard_deviation $5\times 5$ pixels, 1), wherein Y is a pixel value.

17. The system of claim 16, wherein calculating the delta signal comprises calculating $(Y_C-Y_{Ni})*(Centralness_{ni}-Centralness_C)$, wherein $Y_C$ is a pixel value for the central pixel, $Y_{Ni}$ is a pixel value of a neighbor pixel, $Centralness_{ni}$ is a produced centralness metric for the neighboring pixel and $Centralness_C$ is a produced centralness metric for the center pixel.

18. The system of claim 17, wherein the delta signal for the neighboring pixel is set to zero if Centralnessni>CentralnessC*a.

19. The system of claim 17, wherein the delta signal for the neighboring pixel is set to $-(Y_C-Y_{Ni})*(Centralness_{ni}-Centralness_C)$ if Centralnessni>CentralnessC*a.

20. The system of claim 17, wherein calculating the delta signal further comprises summing the calculated signals for each pixel of the set of pixels.

21. The system of claim 20, wherein generating the squeezed pixel comprises adding a gain times the delta signal to the central pixel value.

22. The system of claim 13, wherein the set of pixels includes four diagonal neighbor pixels.

* * * * *